(12) United States Patent
Jorgensen et al.

(10) Patent No.: US 8,523,275 B2
(45) Date of Patent: Sep. 3, 2013

(54) POLYCARBONATE WINDOW FRAME SYSTEM

(75) Inventors: Chad K. Jorgensen, Byron, MN (US); Greg D. Finnes, Kasson, MN (US)

(73) Assignee: Caterpillar Inc., Peoria, IL (US)

(*) Notice: Subject to any disclaimer, the term of this patent is extended or adjusted under 35 U.S.C. 154(b) by 358 days.

(21) Appl. No.: 12/616,160

(22) Filed: Nov. 11, 2009

(65) Prior Publication Data
US 2010/0123335 A1   May 20, 2010

Related U.S. Application Data

(60) Provisional application No. 61/114,852, filed on Nov. 14, 2008.

(51) Int. Cl.
*B62D 33/06* (2006.01)
*B60J 1/00* (2006.01)

(52) U.S. Cl.
USPC ............. 296/190.1; 296/201; 296/96.21; 296/193.06

(58) Field of Classification Search
USPC ........ 296/190.03, 190.1, 201, 96.21, 146.15, 296/193.06; 52/208
See application file for complete search history.

(56) References Cited

U.S. PATENT DOCUMENTS

| | | | | |
|---|---|---|---|---|
| 1,394,045 | A | * 10/1921 | Stretch | 296/96.21 |
| 4,046,933 | A | 9/1977 | Stefanik | |
| 4,619,479 | A | * 10/1986 | Martin, Jr. | 296/190.1 |
| 4,719,728 | A | 1/1988 | Eriksson et al. | |
| 4,773,695 | A | * 9/1988 | Jones et al. | 296/77.1 |
| 4,933,227 | A | 6/1990 | Stewart | |
| 5,269,585 | A | 12/1993 | Klages et al. | |
| 5,765,325 | A | * 6/1998 | DeBlock | 52/204.5 |
| 6,322,136 | B2 | 11/2001 | Boyce et al. | |
| 6,427,795 | B1 | 8/2002 | Johnson et al. | |
| 6,485,084 | B2 | 11/2002 | Sorensen et al. | |
| 6,689,240 | B2 | 2/2004 | Jesse | |
| 2008/0048426 | A1 | 2/2008 | Frett et al. | |
| 2008/0155902 | A1 | 7/2008 | Kaiser | |
| 2009/0026803 | A1* | 1/2009 | Yano et al. | 296/190.1 |
| 2009/0229216 | A1 | 9/2009 | Duncan et al. | |

* cited by examiner

*Primary Examiner* — Dennis Pedder
(74) *Attorney, Agent, or Firm* — Miller, Matthias & Hull

(57) ABSTRACT

A polycarbonate window system having an integrated ROPS that reduces the thickness of cab posts of machine such that the operator's visibility is increased. The polycarbonate window system also facilitates secure retention of the polycarbonate window without requiring holes to be formed near the periphery of the polycarbonate window, thereby increasing the structural integrity of the polycarbonate window.

19 Claims, 6 Drawing Sheets

POLYCARBONATE WINDOW FRAME SYSTEM

TECHNICAL FIELD

This disclosure relates generally to window frame systems, and more specifically, to window frame systems for polycarbonate windows having integrated roll over protection.

BACKGROUND

Several mobile machines, especially those used in forestry applications such as, e.g., forwarders, skidders, or feller bunchers, have a cab structure to protect the operator that includes a roll over protection structure (ROPS). For example, Frett et al. disclose a work vehicle including a typical operator cab frame and a roll-over protective structure mounted to the frame (published U.S. Patent Application No. 2008/0048426). Also, International ROPS Standards, such as ISO3471, SAEJ1040, AS2294.2, require that the operator cab withstand given lateral, vertical and longitudinal forces, as well as absorb a minimum lateral energy. In a machine roll over, the energy absorbing criteria assists in slowing down the lateral rotation of the machine. For conventional construction machinery ROPS, generally a rectangular tubular frame may absorb lateral energy by bending at the corners, in the manner of a parallelogram, without intruding into a defined operator space or coming up against the machine chassis.

Further, mobile machines that are used in a setting where they are often in physical contact with the environment, such as forestry settings, utilize polycarbonate windows to prevent damage to the windows and the operator. To accommodate both the ROPS and the use of polycarbonate windows, many machines have thick corner posts that may obstruct the operator's view and a polycarbonate window that is bolted into a frame through the window's periphery.

In the past, a machine's ROPS was the primary focus of the design, and thick, wide posts were incorporated in the ROPS. However, as different materials and different post substructures have developed, such as multi-walled tubes or waved shaped supporting post substructures, the material required to be used in a suitable ROPS post has decreased. Such a transition has also been motivated, in part, by the desire to increase operator visibility.

Another way that operator visibility was hampered in the past was the presence of a distinct ROPS post and a window frame. The window frame was commonly joined to the ROPS post or frame, then the windows were inserted to the frame and fastened in place, such as with a bolt through the window's periphery and into the frame when an outer plate was used to effectively sandwich the glass between the outer plate and the window frame. Overall, this additional structure further decreased operator visibility.

The present invention is directed to overcome one or more of the problems as set forth above.

SUMMARY OF THE INVENTION

In one embodiment, the present disclosure is directed to a window framing system comprising a continuous polycarbonate window having a thickness, t; a post system having a main post body and a post protrusion that extends from the main post body a distance of at least about t; and a retainer fixedly attached to the post system. It is also directed to a cab of a mobile machine and a forestry forwarder having such a window framing system.

DETAILED DESCRIPTION

Figure 1:
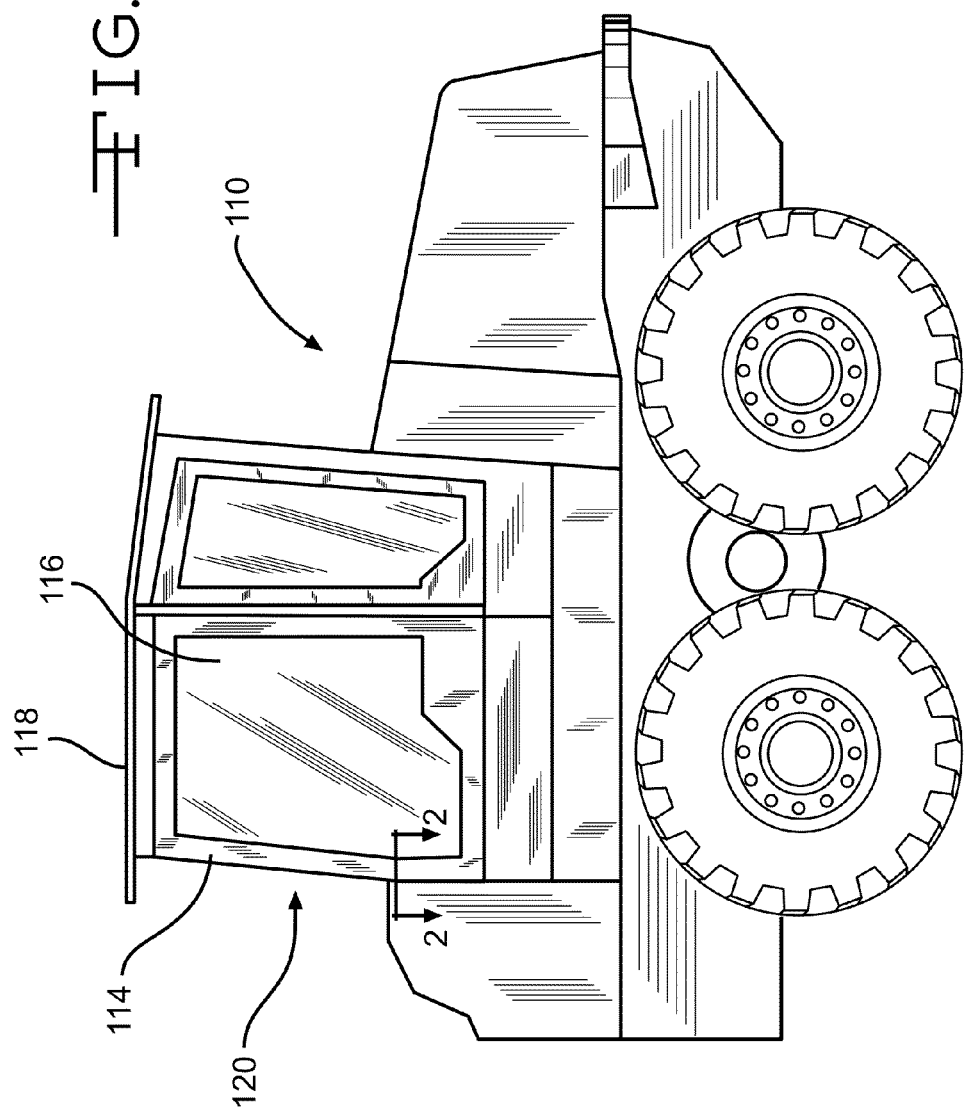
FIG. 1 is a schematic representation of an operator cab of a forestry forwarder according to the immediate disclosure.
Figure 2:
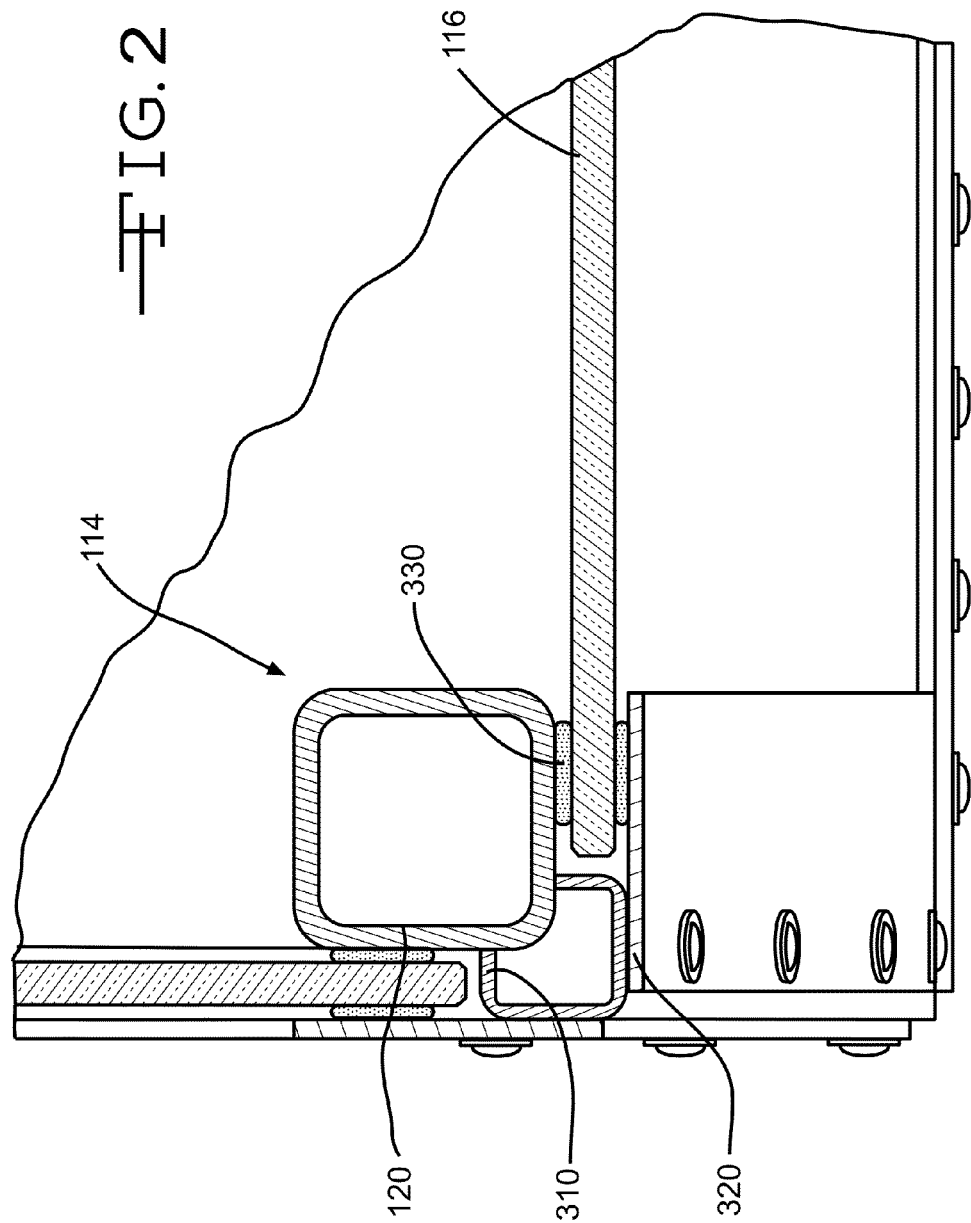
FIG. 2 is a cross-sectional view of a post system of the operator cab.

Referring to FIG. 1, a forestry forwarder 110 will be referenced herein for exemplary purposes only, while the scope of the invention is more accurately reflected by the accompanying claims and applies to other mobile machines. Forestry forwarder 110 comprises an operator cab 112, the structure of which comprises post system 114, windows 116, and a roof 118, as shown in FIG. 2. The roof 118 and post system 114 are also components of the machine's ROPS.

Figure 3:
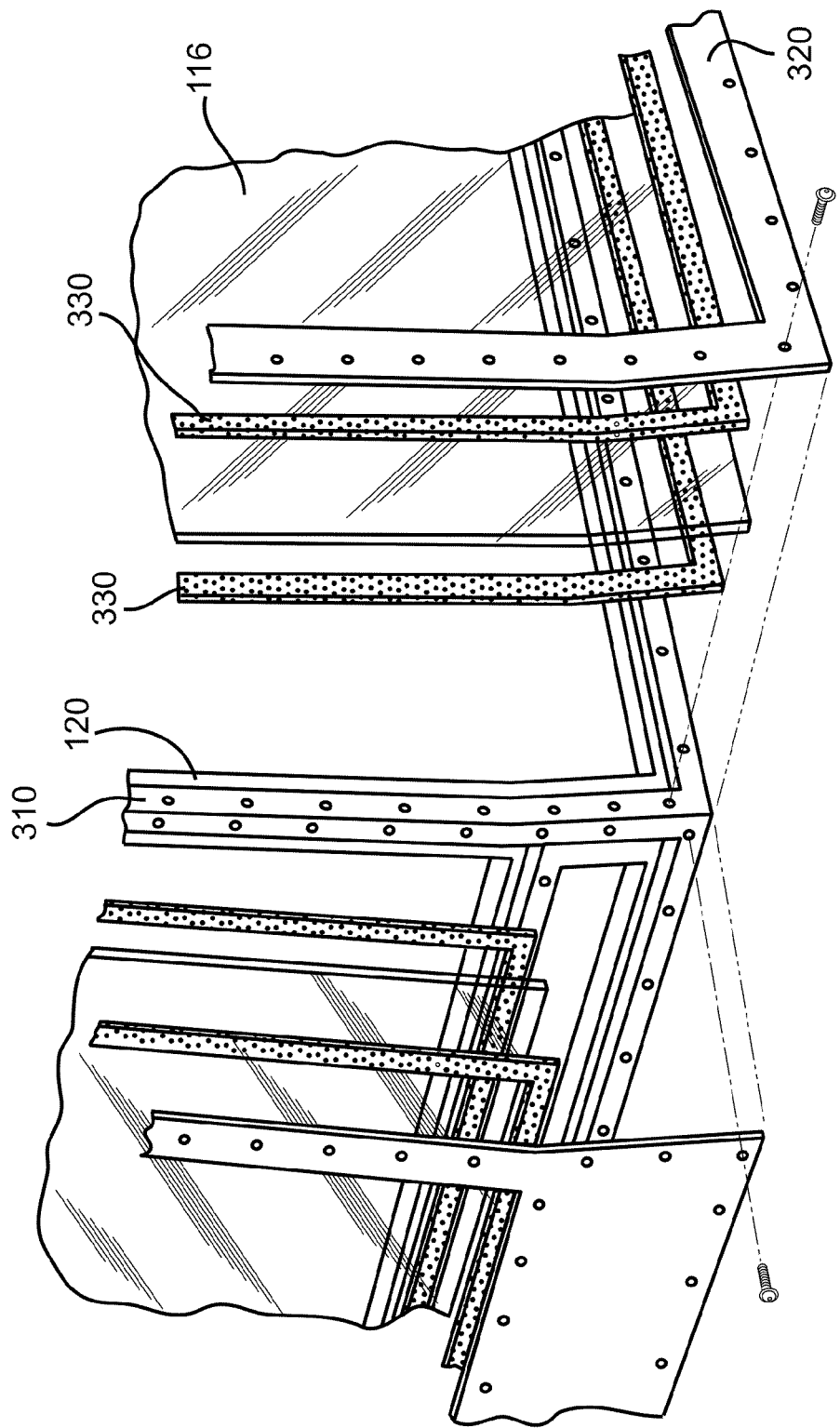
FIG. 3 is an exploded view of the post system of the operator cab.

FIG. 2 shows a cross-section of post system 114 while FIG. 3 shows an exploded view of the same. Post system 114 comprises a main post body 120 that is of appropriate dimensions to satisfy any ROPS requirements and maximize operator viewing area. For example, regardless of whether main post body 120 is triangular, tetrahedral, octagonal, circular, or some other geometric shape, the distance between the furthest two points of main post body 120 in cross-section is between about 2 inches and about 12 inches, such as between about 4 inches and about 9 inches. For example, when main post body 120 is tetrahedral, main post body 120 is between about 2 inches and about 5 inches wide and between about 2 inches and about 5 inches thick, such as between about 3 inches and about 4.5 inches wide and between about 3 inches and about 4.5 inches thick.

Post system 114 is designed such that it includes a post protrusion 310, which is a feature that protrudes to align with the edge of windows 116 and extends from main post body 120 a distance of at least the thickness of window 116, such as between about 0.25 inches and about 1.0 inches. Post protrusion 310 may be continuous, such that post protrusion 310 is a feature present around all of window 116. In other embodiments, post protrusion 310 is discontinuous, such that the protrusions are strategically located around window 116, as shown in FIG. 5.

As shown in FIG. 2, post protrusion 310 may take the shape of a smaller, partial version of main post body 120. Post protrusion 310 effectively acts as a spacer to stabilize and position the windows 116 in the correct orientation. Post protrusion 310 may be configured to partially support a retainer 320, which extends over the windows 116 to hold them in place when retainer 320 is secured to post system 114, i.e., to main post body 120 or to post protrusion 310.

Figure 4:
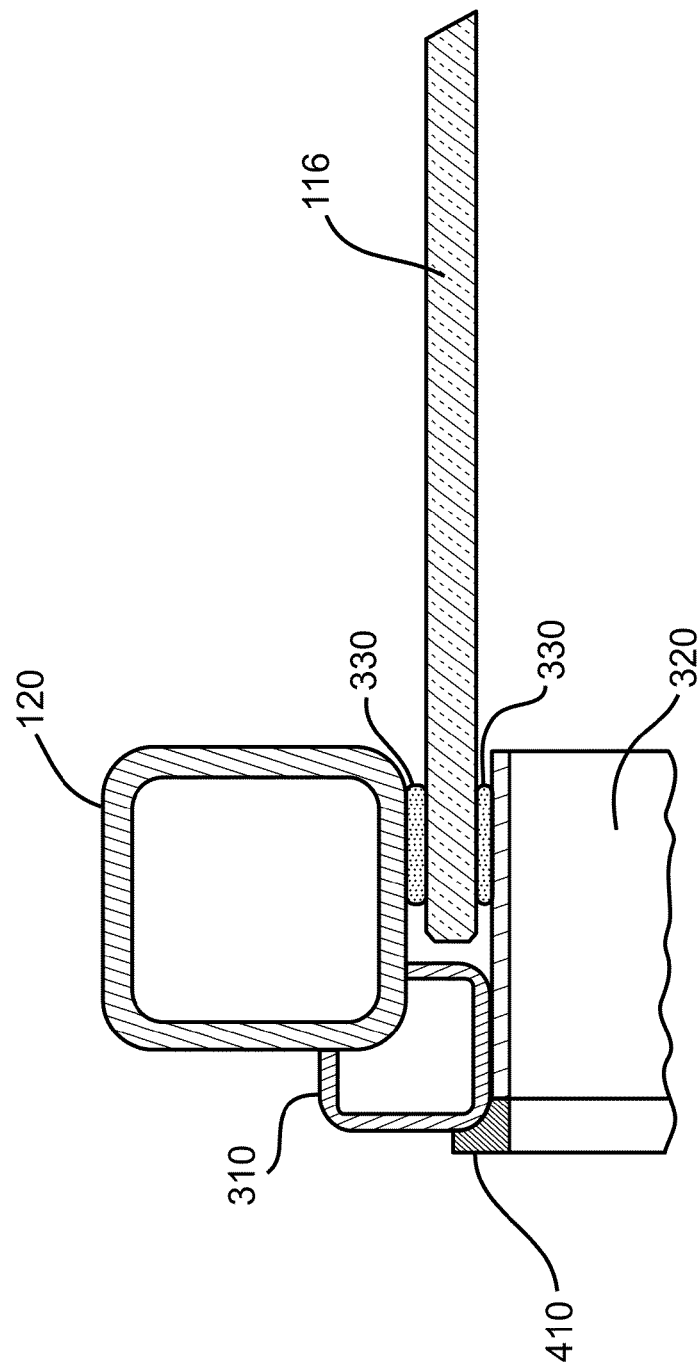
FIG. 4 is a cross-sectional view of the post system with a retainer ledge.

In an alternative embodiment, post system 114 comprises post protrusion 310 and a retainer ledge 410 that is designed to partially support retainer 320, as shown in FIG. 4. Retainer ledge 410 extends beyond post protrusion 310 by a distance approximately equal to the thickness of retainer 320, such as by between about 0.1 inches and about 0.5 inches. For example, retainer ledge 410 typically extends beyond post protrusion 310 by between about 0.15 inches and about 0.25 inches. In this way, retainer 320 is oriented such that its outer surface is flush with the outer surface of post protrusion 310.

Figure 5:
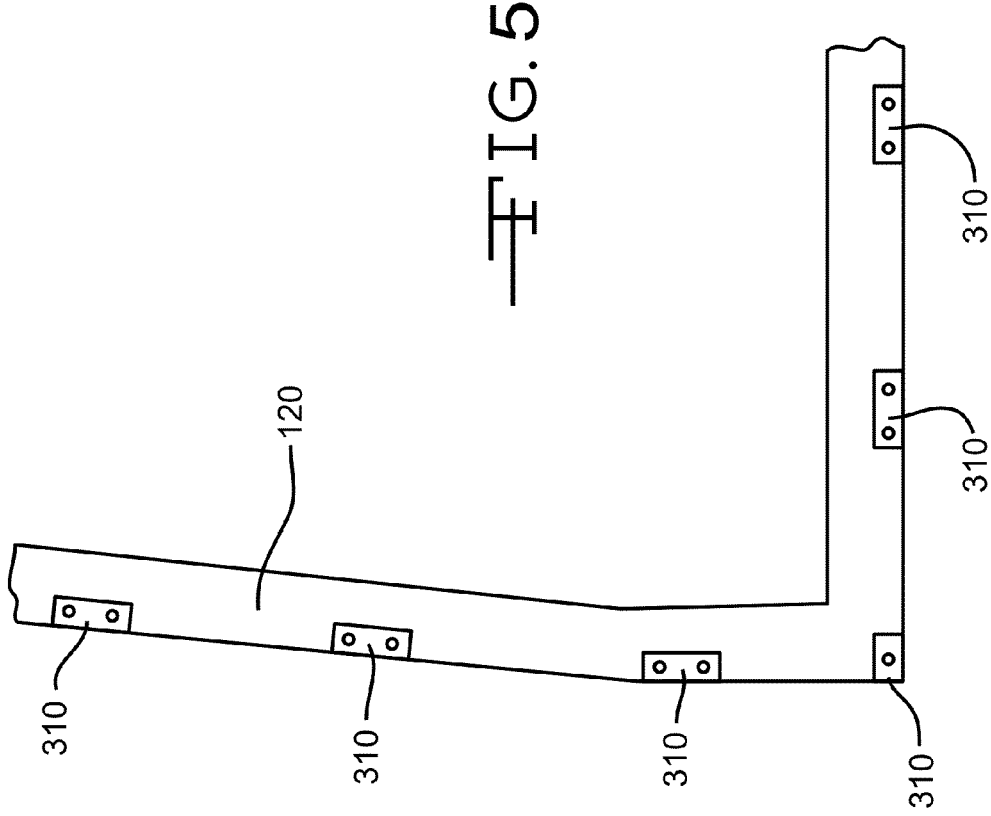
FIG. 5 is a schematic representation of a post system having discontinuous post protrusions.

Moreover, post protrusion 310 may be configured to extend continuously around main post body 120, as shown in FIG. 3, or post protrusion 310 may be arranged at particular intervals around main post body 120, as shown in FIG. 5.

Windows 116 are made of a polycarbonate polymer material and of an appropriate thickness, t, to withstand encounters with objects from the environment, such as tree branches or limbs. For example, windows 116 may be between about 0.25 inches and about 1.0 inches thick, such as between about 0.4 inches and about 0.7 inches thick. In one example, windows 116 are about 0.5 inches thick. The thickness of window 116 is substantially similar over the length and width of window 116. Furthermore, windows 116 may comprise a polarizing film to diminish ultraviolet (UV) radiation impact on the operator, such as reducing UV glare. Polycarbonate windows 116 are also continuous material, i.e., there are no features such as bolt holes formed near the periphery of window 116.

Figure 6:
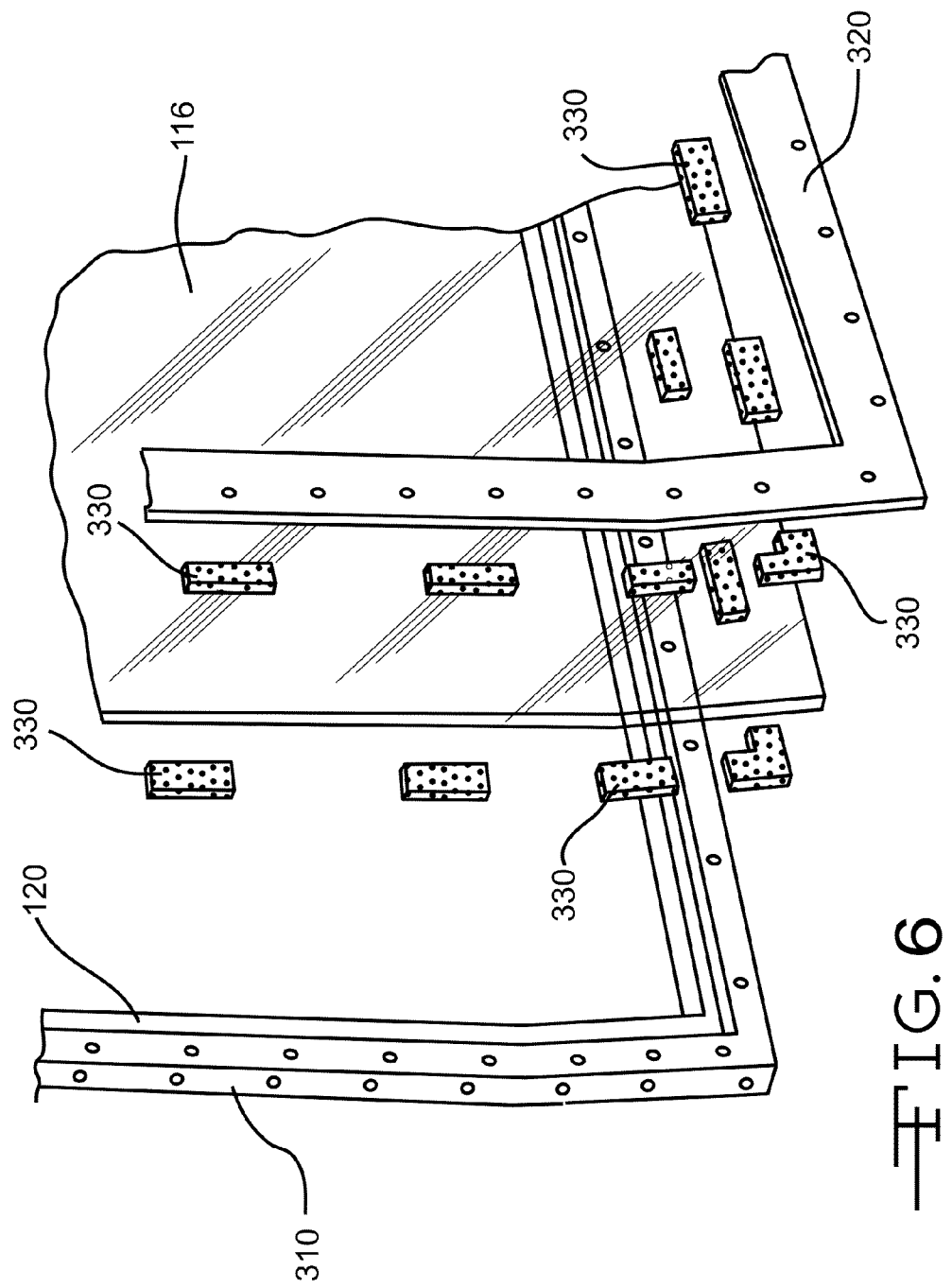
FIG. 6 is an exploded view of the post system of the operator cab having a discontinuous seal.

Seals 330 may be included to firmly hold the window 116 stationary. Seals 330 can be arranged in any desired orientation on main post body 120 and/or retainer 320 to achieve such a stabilizing effect. Seals 330 may be attached to main post body 120 and/or retainer 320 using any suitable means, such as adhesives or fasteners. Seals 330 comprises an elastic or foamed polymeric material that can support window 116 in its intended position without compromising the integrity of window 116. The seals may be continuous, such that the entire periphery of window 116 is sealed, or it may be discontinuous, such that gaps in the seal are present, as seen in FIG. 6.

INDUSTRIAL APPLICABILITY

The disclosed cab achieves two important improvements for operator use of the machine. First, post system 114 are smaller than previous posts and window framing systems because the framing system is integrated into posts 114. By utilizing such an arrangement, the operator's visibility is dramatically increased. Moreover, by using less raw materials to form post system 114 than in previous examples, a cost advantage may be realized. However, this advantage does not compromise the ROPS requirements by still maintaining appropriate minimum material and dimensional characteristics for post system 114.

Second, designing post system 114 to have retainer 320, which is designed to be joined or secured to post system 114, and seals 330 allows window 116 to be securely held in position without having holes formed or cut into the periphery of window 116 as in previous designs. Such holes would be designed into prior art windows so bolts or other fasteners may pass through the window before encountering post system 114. The lack of such holes in the immediately disclosed polycarbonate window is important, in part, because polycarbonate window manufacturers propose that sheets of polycarbonate should be retained in their state as a continuous object without holes or other features cut out of the polycarbonate. Such features can act as stress points and compromise the integrity of the polycarbonate object, i.e., window 116. Therefore, the disclosed window framing system allows the manufacture of cabs that afford increased visibility for operators while simultaneously improving the integrity of polycarbonate windows 116.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. A window framing system comprising:
    a continuous polycarbonate window having a thickness, t, an edge and an outer surface;
    a main post body having at least three sides forming a closed cross-sectional shape, each side extending between a pair of vertices, two of the vertices defining parallel boundaries of area blocking an operator's line of sight;
    a post protrusion that extends from the main post body a distance of at least about t and aligns with the edge of the polycarbonate window without contacting the polycarbonate window, the post protrusion having at least three sides forming an open cross-sectional shape, the post protrusion contacting two sides of the main post body adjacent one of the main post body vertices, the post protrusion and a portion of the main post body forming a closed cross-sectional shape, the post protrusion being hidden from the operator's line of sight by the area; and
    a retainer fixedly attached to the post protrusion, the retainer extending over the outer surface of the polycarbonate window without contacting the edge of the polycarbonate window.

2. The window framing system of claim 1, wherein the main post body is between about 2 inches and about 5 inches wide and between about 2 inches and about 5 inches thick.

3. The window framing system of claim 1, wherein the post protrusion extends from the main post body a distance of between about 0.25 inches and about 1.0 inches.

4. The window framing system of claim 1, the post system including a retainer ledge that extends from the post protrusion by a distance of between about 0.1 inches and about 0.5 inches.

5. The window framing system of claim 1, wherein the post protrusion comprises multiple spaced apart segments arranged at intervals around the main post body.

6. The window framing system of claim 1, wherein t is between about 0.25 inches and about 1.0 inches thick.

7. The window framing system of claim 1, including seals on the main post body and on the retainer.

8. A cab of a mobile machine, the cab having a window framing system comprising:
    a continuous polycarbonate window having a thickness, t, an edge, and an outer surface;
    a main post body having four sides forming a closed cross-sectional shape, each side extending between a pair of vertices, two of the vertices defining boundaries of an area blocking an operator's line of sight;
    a post protrusion that extends from the main post body a distance of at least about t and aligns with the edge of the polycarbonate window, the post protrusion having four sides and three vertices and forming an open cross-sectional shape, the post protrusion contacting two sides of the main post body in close proximity to one of the main post body vertices, the post protrusion and a portion of the main post body forming a closed cross-sectional shape, the post protrusion outside of the operator's line of sight; and
    a retainer fixedly attached to the post protrusion, the retainer extending over the outer surface of the polycarbonate window without contacting the edge of the polycarbonate window.

9. The cab of claim 8, wherein the main post body is between about 2 inches and about 5 inches wide and between about 2 inches and about 5 inches thick.

10. The cab of claim 8, wherein the post protrusion extends from the main post body a distance of between about 0.25 inches and about 1.0 inches.

11. The cab of claim 8, the post system including a retainer ledge that extends from the post protrusion by a distance of between about 0.1 inches and about 0.5 inches.

12. The cab of claim 8, wherein the post protrusion comprises multiple spaced apart segments arranged at intervals around the main post body.

13. The cab of claim 8, wherein t is between about 0.25 inches and about 1.0 inches thick.

14. The cab of claim 9, including seals on the main post body and on the retainer.

15. A double post window framing system comprising:
a first continuous polycarbonate window having a first perimeter edge and defining a first plane;
a second continuous polycarbonate window having a second perimeter edge and defining a second plane orthogonal to the first plane;
the first and second perimeter edges being spaced apart;
a main post body affixed to the first and second polycarbonate windows by seals, the main post body having a closed cross-sectional shape defining a first area and having a plurality of sides, each side extending between a pair of vertices, one main post body side being parallel to the first plane and another main post body side being parallel to the second plane;
a post protrusion having a plurality of sides, the post protrusion contacting two sides of the main post body on either side of one of the main post body vertices, the post protrusion and a portion of the main post body the forming a closed cross-sectional shape defining a second area smaller than the first area, one of the post protrusion sides being parallel to the first plane and another post protrusion side being parallel to the second plane.

16. The window framing system of claim 15, wherein the main post body is between about 2 inches and about 5 inches wide and between about 2 inches and about 5 inches thick.

17. The window framing system of claim 15, wherein the post protrusion extends from the main post body a distance of between about 0.25 inches and about 1.0 inches.

18. The window framing system of claim 15, the post system including a retainer ledge that extends from the post protrusion by a distance of between about 0.1 inches and about 0.5 inches.

19. The window framing system of claim 15, wherein the post protrusion comprises multiple spaced apart segments arranged at intervals around the main post body.

* * * * *